No. 770,470. PATENTED SEPT. 20, 1904.
H. S. MILLS.
COMBINED PICTURE EXHIBITOR AND PHONOGRAPH.
APPLICATION FILED MAY 12, 1904.
NO MODEL. 8 SHEETS—SHEET 1.

Witnesses:
Geo. E. Gaylord,
John Enders.

Inventor:
Herbert S. Mills,
By Dynenforth, Dynenforth & Lee.
Attys.

No. 770,470. PATENTED SEPT. 20, 1904.
H. S. MILLS.
COMBINED PICTURE EXHIBITOR AND PHONOGRAPH.
APPLICATION FILED MAY 12, 1904.
NO MODEL. 8 SHEETS—SHEET 5.

Witnesses:
Inventor:
Herbert S. Mills,

No. 770,470. PATENTED SEPT. 20, 1904.
H. S. MILLS.
COMBINED PICTURE EXHIBITOR AND PHONOGRAPH.
APPLICATION FILED MAY 12, 1904.
NO MODEL. 8 SHEETS—SHEET 8.

Witnesses:
Chas E Gaylord
John Enders

Inventor:
Herbert S. Mills,
By Dymphrick, Dymphrick & Lee,
Attys.

No. 770,470. Patented September 20, 1904.

UNITED STATES PATENT OFFICE.

HERBERT S. MILLS, OF CHICAGO, ILLINOIS.

COMBINED PICTURE-EXHIBITOR AND PHONOGRAPH.

SPECIFICATION forming part of Letters Patent No. 770,470, dated September 20, 1904.

Application filed May 12, 1904. Serial No. 207,558. (No model.)

*To all whom it may concern:*

Be it known that I, HERBERT S. MILLS, a citizen of the United States, residing at Chicago, in the county of Cook and State of Illinois, have invented a new and useful Improvement in a Combined Picture-Exhibitor and Phonograph, of which the following is a specification.

The primary object of my invention is so to combine in a coin-controlled apparatus a phonograph or analogous instrument with a picture-exhibitor that by introducing into the apparatus a coin of proper denomination they will coöperate, the exhibitor to display pictures in succession and the phonograph to render during the exhibition speech or music, preferably of a character descriptive of the pictures. It is desirable that the coöperation shall be such as to cause the picture-display and the rendition by the phonograph to endure correspondingly by regulating accordingly the time of exposure of the pictures, and it is also desirable that facility shall be afforded for enabling regulation to be made of the time of exposure of each picture brought into the line of vision in the exhibitor, so that variation in the time may be had between different pictures in the series thereof in the course of the phonographic or other rendition, the better to suit the latter to the display. I accomplish these objects by my invention which is embodied in the mechanism illustrated in the accompanying drawings, in which—

Figure 11:
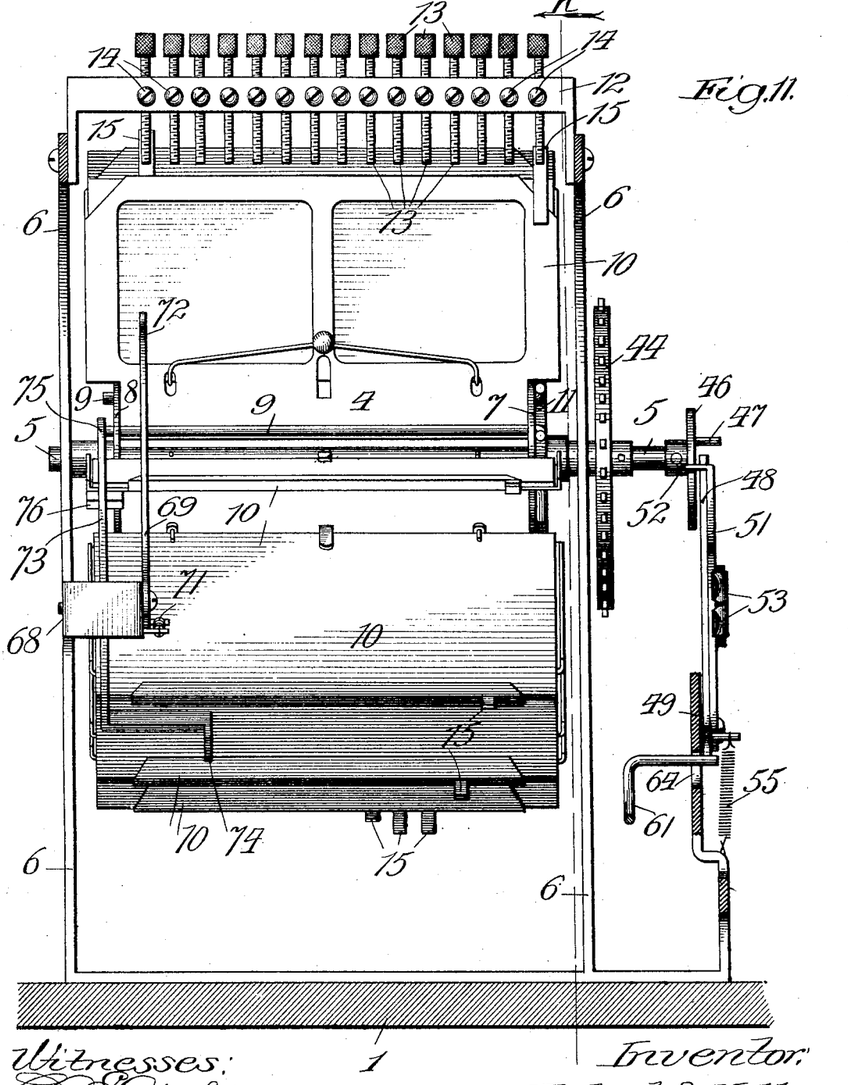
Fig. 11, a section taken at the line J on Fig. 2 and viewed in the direction of the arrow.
Figures 12, 13:
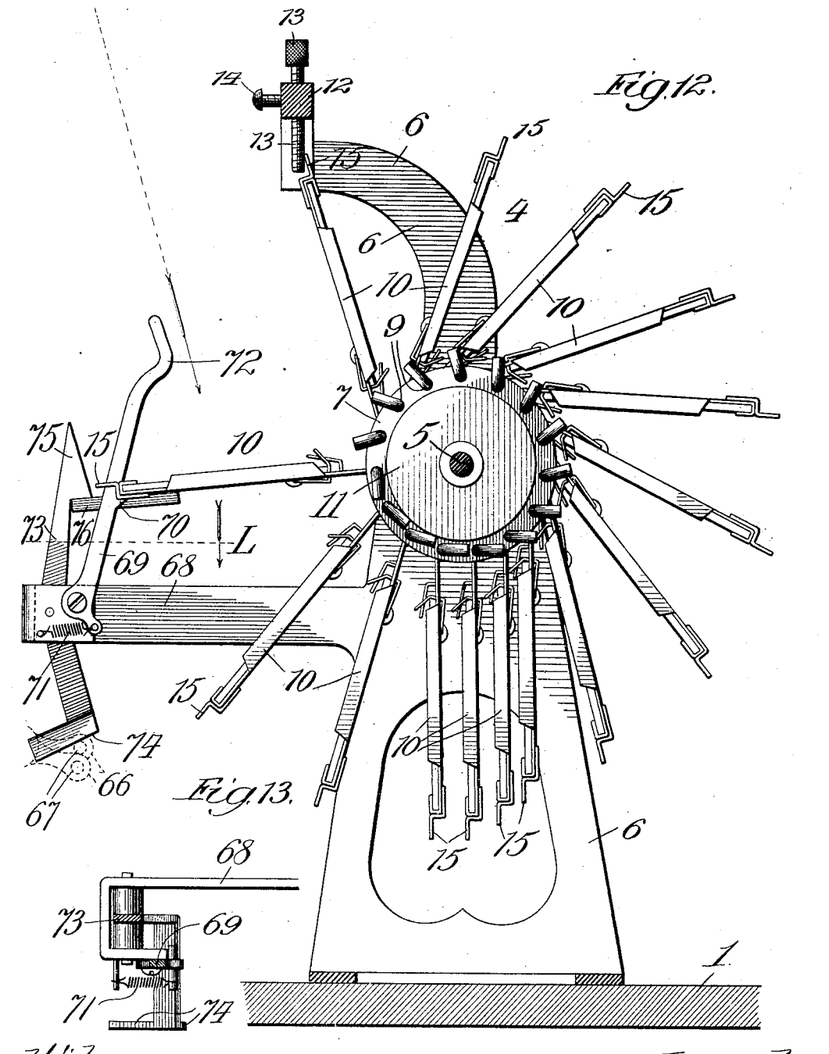
Fig. 12, a section taken at the line K on Fig. 11 and viewed in the direction of the arrow.
Fig. 13, a section taken at the line L on Fig. 12 and viewed in the direction of the arrow.

1 is the casing, which may be of any suitable general shape, including that commonly employed in coin-controlled picture-exhibitors, with stereopticon-lenses 2 in suitable position upon it. Within the casing are mounted a phonograph 3, that shown being of the usual general construction, and a picture-exhibitor 4, which may also in general construction be like that commonly employed in coin-controlled picture-exhibitors. It consists of a shaft 5, journaled in a frame 6 and carrying near its opposite ends disk-shaped heads 7 and 8, in which rods 9 are loosely mounted at their ends at suitable intervals apart about the heads. On each rod is secured at its base a picture holder or frame 10, adapted by the nature of its support in the heads to flop over or drop thereon into the line of vision (indicated by a dotted line and arrow in Fig. 12) of the lenses 2 in the rotation of the shaft. To prevent the frames from bunching in being carried about by the shaft, I provide on the outer face of the head 7 a circular boss 11 and bend the adjacent protruding end of each rod 9 to a right angle, as shown, to form a stop, whereby when the rod turns with the drop of the frame upon it its bent end will abut against the edge of the boss and stop the frame against loosely depending vertically after being released from its display position, where it is temporarily held, as hereinafter described, thus spacing the frames apart. In the path of the outer edges of the frames is interposed a stop device encountered by them in their circuitous course, operating to hold each from dropping into the display position, while the one preceding it occupies that position to display the picture it carries, the release of the frame thus stopped being effected by the continued turning of the heads 7 8, whereby the respective frame-carrying rod is caused to travel downward through an arc and the upper edge of the frame is thus drawn below the stop and released for dropping. An important feature of the invention relates to this stop. As shown, it comprises a bar 12, connecting at their upper ends the arms of the shaft-frame 6, between which the picture-frames move, this bar having mounted in it at intervals vertically-adjustable stops 13, shown as pins in their preferred form of headed screws, of which fifteen are represented, though their number should correspond with the number of the picture-frames provided, and set-screws 14 are shown in the face of the bar 12, one for each stop-screw to engage with and hold it in its adjusted position. Each picture-frame has a lug 15 projecting from its free outer or forward edge to coincide with a stop 13 in the horizontal series thereof, so that these lugs on the successive picture-frames describe a spiral series, as indicated in Fig. 11.

Generally stated, the phonograph is driven by a motor, as is also the picture-frame shaft, and it is preferred for simplicity, economy, and regularity of action to employ the same motor for both, though this is not necessary, and any suitable character of motor may be employed; but an electric motor is most desirable, because of its own inherent advantages and also because the current for running it may furnish the supply for an electric lamp 16, supported in proper position in the casing of the apparatus to illuminate the picture under display, the lamp being shown to be equipped with a reflector 17 for throwing the light upon such picture. At 18 is indicated an electric motor, which may be of any suitable variety or construction. Its shaft is geared, as by a belt 19, with a shaft 20, journaled in a frame 21 on the adjacent end of the phonograph and carrying a pinion 22, meshing with a cog-wheel 23 on a shaft 24, carrying a pinion 25 and a cog-wheel 26, which meshes with a pinion 27 on the governor-shaft 28 of the phonograph. The pinion 25 meshes with a cog-wheel 29 on a shaft 30, carrying a pinion 31, meshing with a gear 32 on a shaft 33, said gear 32 meshing with a pinion 34 on the screw-shaft 35 of the phonograph, and a pinion 36 on the shaft 33 meshes with a similar pinion 37 on a stub-shaft 38. A large gear-wheel 39 is carried on a shaft 40, journaled on an extension 41 of the phonograph-frame, this shaft carrying a sprocket-pinion 42, connected by a chain 43 with a sprocket-wheel 44 on the picture-frame shaft. Thus the electric motor rapidly drives the shaft 20 to rotate the screw-shaft 35 for slowly advancing the reproducer 45 of the phonograph and to rotate the picture-frame shaft slowly. This last-named shaft 5 carries on one end a cam-head 46, having a stud 47 projecting from it to engage with the end, projecting into its path, of a bell-crank lever 48, fulcrumed on a bearing-plate 49 and provided with a stud 50, on which bearing-plate and on the same fulcrum is pivotally supported a bell-crank lever 51, having a finger 52 extending at a right angle from its upper end into the path of the cam on the head 46. The lever 51 carries an electric contact 53 to coöperate with a similar contact 54, supported by the bearing-plate 49, with which it is given a tendency to engage by a spring 55 on the lower end of the bell-crank 48, tending to turn it on its fulcrum to engage its stud 50, with the bell-crank 51 and turn the latter for producing the contact engagement against the resistance of a weaker spring 56 on its lower end.

A coin-chute 57 leads from a coin-insertion opening 58 in the casing to a coin-receptacle, such as a drawer 59, and a vertical slot 60 is formed through the chute 57 near its lower end to admit through it into the path of a descending coin the end portion of the longer arm of a bell-crank 61, fulcrumed at its angle on the bearing-plate 49 and provided with a shoulder 62 on the end of its shorter arm to engage with the adjacent end of the bell-crank 48 for holding the electric contacts normally out of engagement. A spring 63 tends to retain the lever 61 yieldingly in position to be engaged at its shoulder by the lever 48.

In the bearing-plate 49 is an opening 64, through which projects into the path of the lower arm of the bell-crank 48 one end of a bent lever 65, fulcrumed on the frame extension 41 and projecting at its opposite bent end into the path of the lever 66 of the reproducer mechanism of the phonograph, which lever carries a trip-pin 67, projecting forward from it near its free end.

An arm 68, extending forward from a side of the frame 6, which supports the picture-frame shaft 5, toward the finishing end of the phonograph, has pivoted upon it an upwardly-projecting finger 69, provided between its ends with a ledge 70, the arm being held yieldingly by a spring 71 normally to present its ledge in the path of the adjacent corners of the picture-frames 10, and the upper end of this arm is formed as a cam 72 to be engaged by the adjacent corner portions of the picture-frames in succession. Thus each picture-frame in turn in dropping forward is arrested to retain it temporarily in the line of vision by resting upon the ledge 70 until the next succeeding picture-frame in dropping encounters the cam end of the finger 69, and in passing it forces the finger back, thereby releasing from the ledge the picture-frame resting thereon, which drops out of sight, and the spring 71 instantly thereupon returns the finger into position to present to the succeeding falling picture-frame the ledge 70 for arresting it in its position of display. A trip-finger 73 is also fulcrumed between its ends on the arm 68, this finger having its lower end bent to a right angle and provided at the extremity with a transverse cam-finger 74, extending into the path of the trip-pin 67 on the lever 66 of the phonograph-reproducer, and the upper end of the finger 73 has formed upon it a cam-head 75, extending in the path of a comparatively heavy bar 76, projecting from the adjacent corner portion of the first of the series of the picture-frames.

Figure 14:
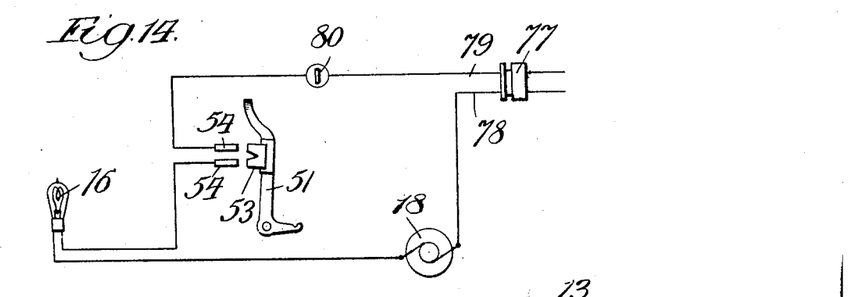
Fig. 14, a diagram of the electric circuits.
Figure 15:
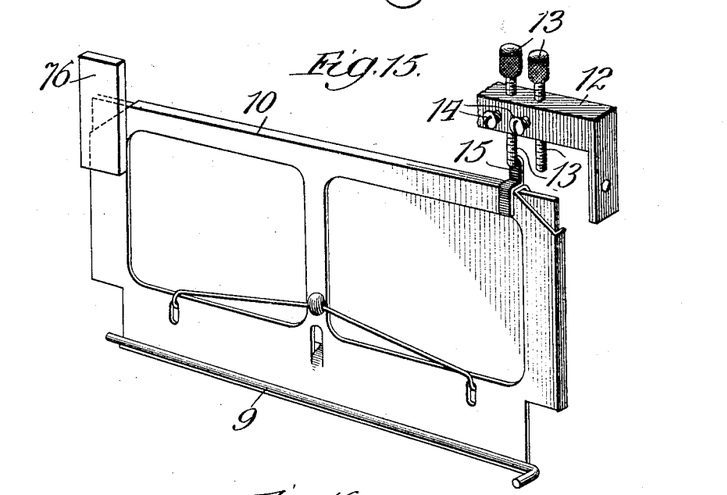
Fig. 15, a perspective view of one of the picture-frames detached.

An electric connector 77, Fig. 14, is represented for connection with any suitable source of electric-current supply, having wires 78 and 79, the former leading from it through the motor 18 and lamp 16 to one prong of the contact 54 and the wire 79 leading through a switch 80 to the other prong of that contact, which prongs are adapted to be bridged by those of the contact 53 to close the circuit at that point.

Figure 1:
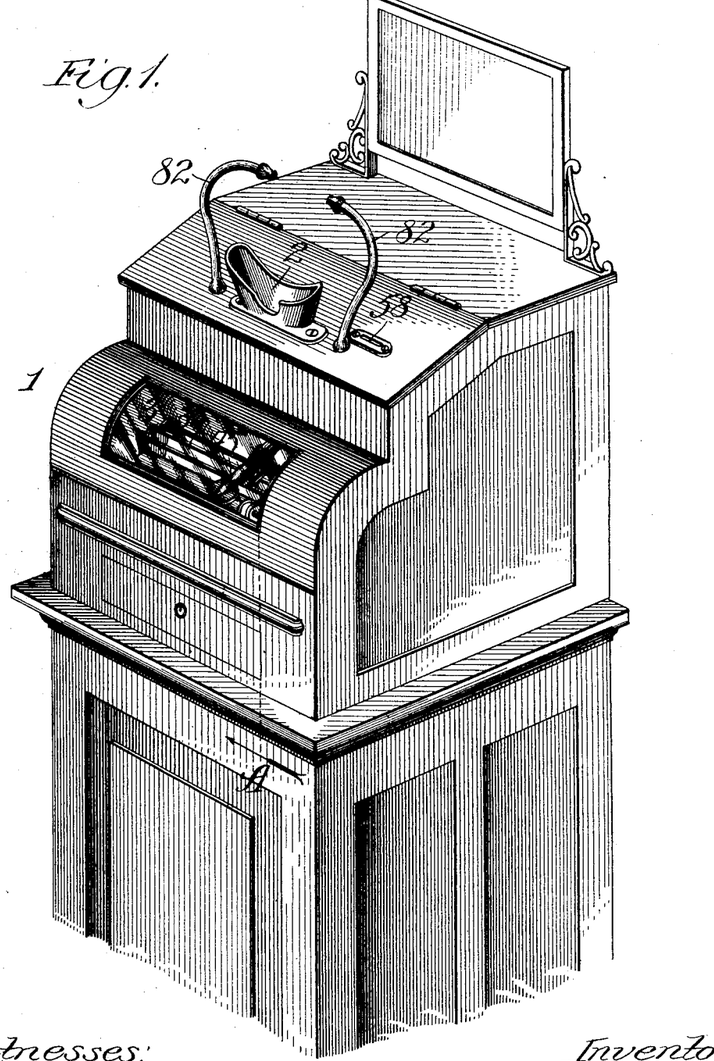
Figure 1 is a perspective view of the apparatus.
Figure 2:
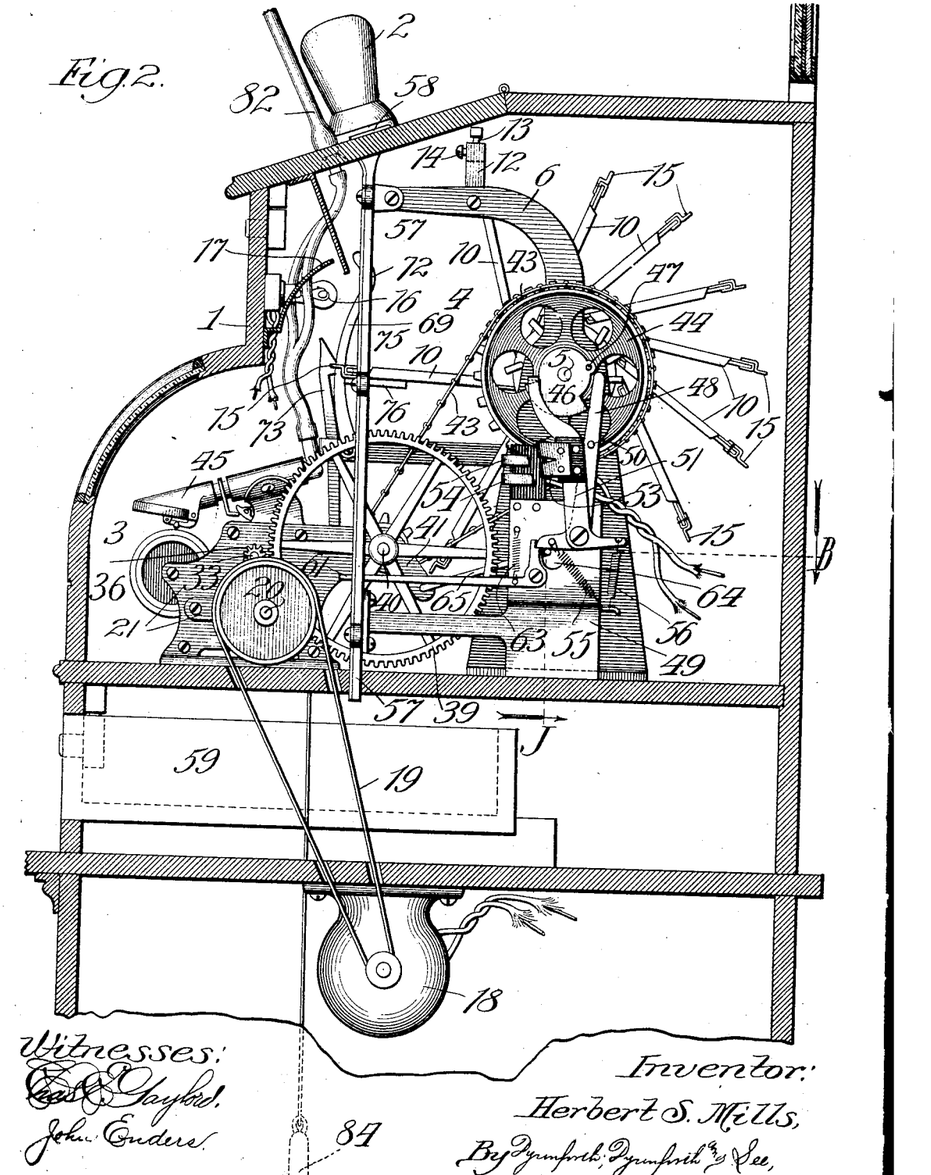
Fig. 2, an enlarged broken section taken at the line A on Fig. 1 and viewed in the direction of the arrow.
Figure 3:
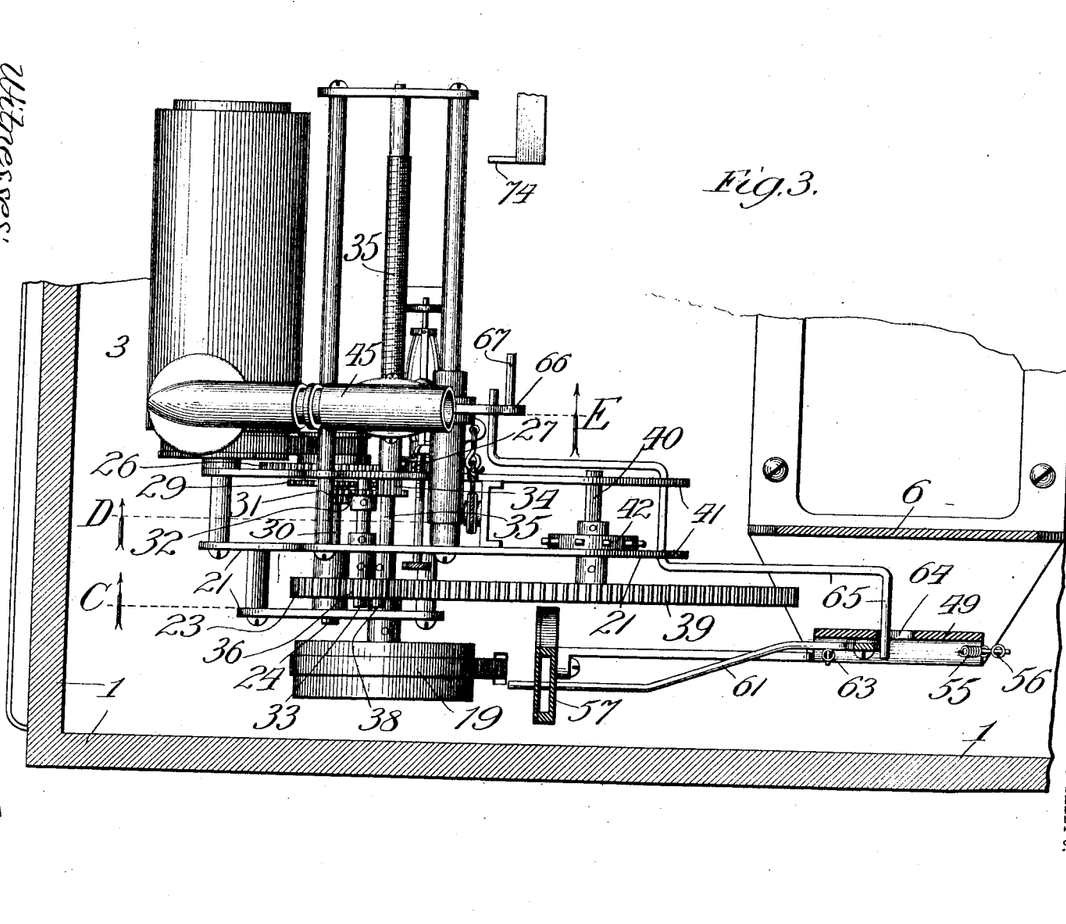
Fig. 3, a broken plan section taken at the line B on Fig. 2 and viewed in the direction of the arrow.
Figures 4, 5, 6:
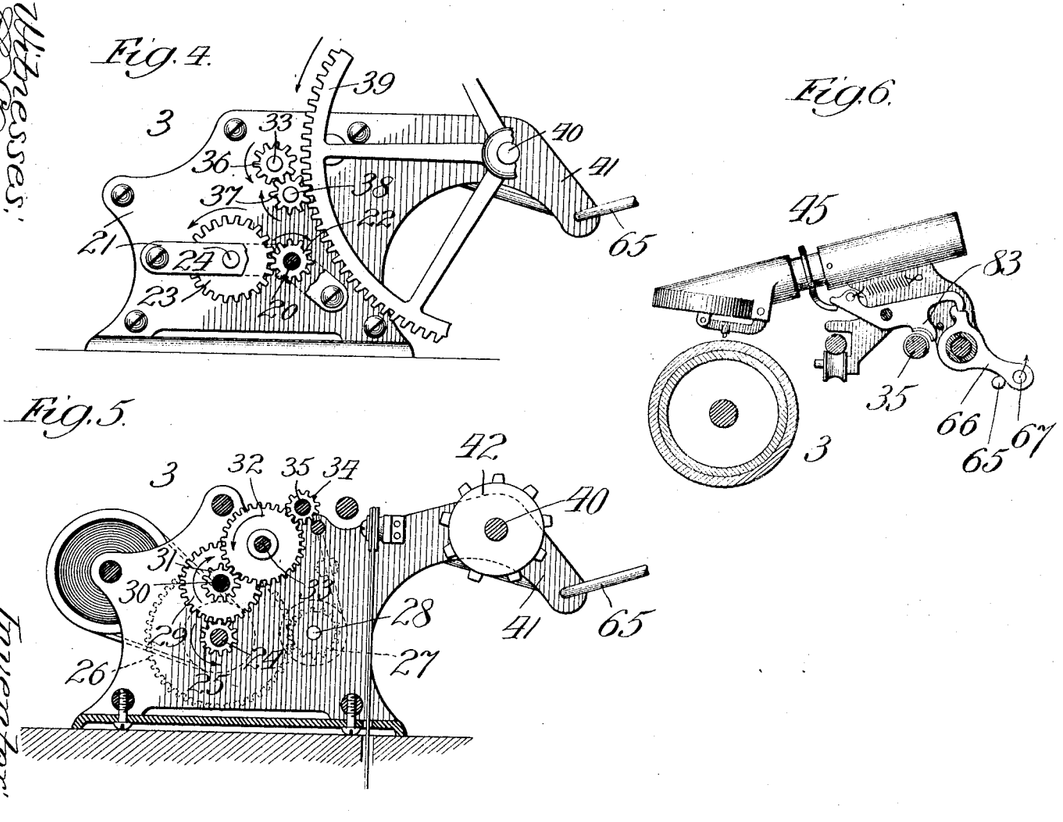
Figs. 4, 5, and 6 are sectional elevations taken, respectively, at the lines C, D, and E on Fig. 3 and viewed as indicated by arrows.
Figures 7, 8, 9:
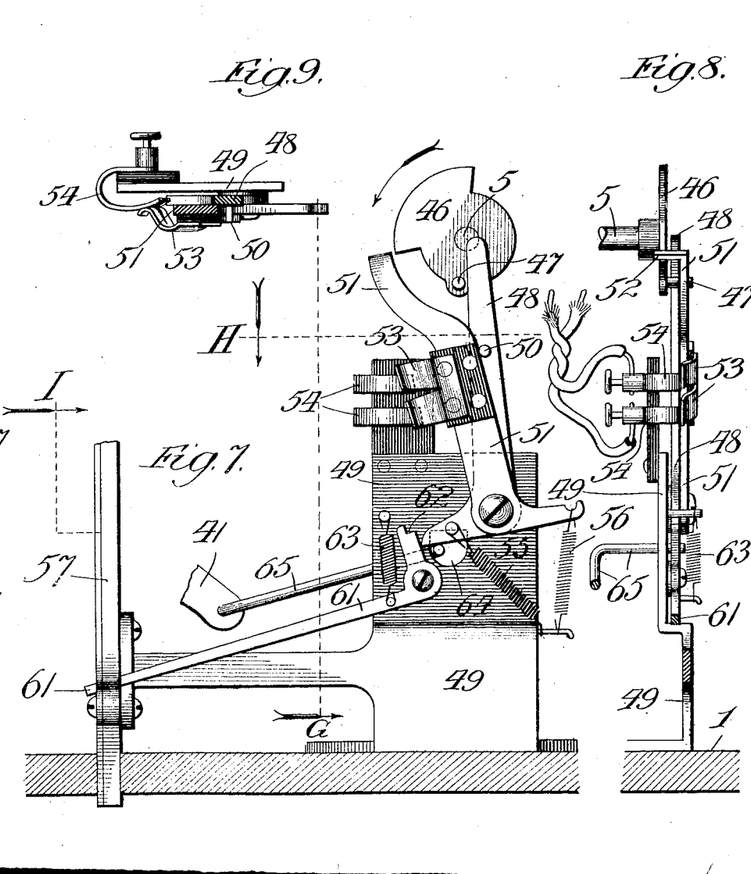
Fig. 7, a broken view showing in side elevation the cam and lever mechanisms illustrated in Fig. 2, which are tripped by the inserted coin to start the apparatus, the parts being represented in their tripped condition.
Fig. 8, a section taken at the line G on Fig. 7 and viewed in the direction of the arrow.
Fig. 9, a section taken at the line H on Fig. 7 and viewed in the direction of the arrow.
Figure 10:
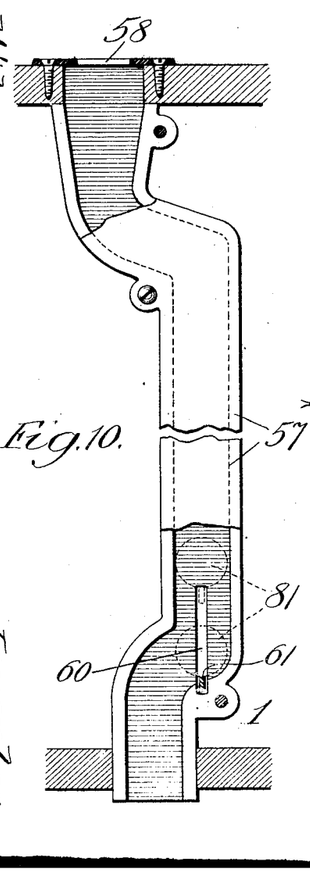
Fig. 10, a broken section taken at the line I on Fig. 7, viewed in the direction of the arrow and enlarged, showing the coin-chute in front elevation.

The operation is as follows: With all the parts at rest in the normal relative positions in which they are illustrated, the operator drops into the coin-chute a coin 81, Fig. 10, of proper denomination and looks through the stereopticon-lenses into the casing with his ears between ear-tubes 82, which extend from the phonograph. The coin in its descent trips the lever 61 in passing into the receptacle 59. Thus tripping this lever withdraws the shoulder at its opposite end from underneath the lever 48, thereby freeing the latter and permitting the spring 55 to throw the lever 48 and engage its stud 50 with the lever 51 to turn it on its fulcrum and apply the contact-prongs thereon to those of the contact 54, with the effect of closing the circuit. The lever 48 in turning encounters at its lower end the lever 65, thereby turning the latter on its fulcrum to trip the lever 66 of the phonograph-reproducer, with the effect of starting the latter by engaging its nut 83 with the screw-shaft 35 for causing the reproducer to travel along the rotating phonograph-cylinder in the usual manner by the rotation of the screw, which is driven by its gear connection with the motor-shaft. The gear connection of the motor with the shaft 5 turns the latter slowly and with it the series of picture-frames hung between its heads. The first picture presented to view will be held by the ledge on the finger 69 until it is freed to drop out of sight by tripping the finger through the medium of the next picture-frame in the series thereof coming into contact with the cam on its upper end. Each picture-frame in the series is stopped by one of the series of stops 13 in the path of its respective lug 15 until the arc described by the shaft-heads 7 and 8 in slowly turning draws the lug below the stop, when the picture-frame encounters and forces backward and drops past the trip-finger 69, retracting the ledge thereon from underneath the previous picture-frame resting upon it, the ledge returning in time to intercept the one so dropping. Meantime the cam-head 46 on the shaft 5 is turning, and when its stud 47 encounters the upper end portion of the lever 48 to turn it on its fulcrum the cam-section of the head is brought to bear at its periphery against the finger 52 on the upper end of the lever 51, preventing the latter from turning under the force of the spring 56 and from thus breaking the electric contact. The effect of thus turning the lever 48, besides tensioning the spring 56, is to raise the end of its lower shorter arm where the shoulder 62 on the lever 61 may be snapped into engagement with it by the recoil of the spring 63 to sustain the lever 48 against the tension of its spring 55 after the stud 47 has passed beyond it and to return the lever 61 to the position to be tripped by the insertion of another coin into the chute. When the cam 46 clears the finger 52, the tension of the spring 56 turns the lever 51 to retract the finger over the edge of the cam to be in the path of the latter in the next operation and with the effect of breaking the electrical contact, whereby the motor stops, putting out the light and bringing the picture-exhibitor and phonographic instrument to a standstill. The movements of the parts are so timed that as the circuit is breaking the picture-frame carrying the bar 76, and which will be the first for display in the next operation of the machine, drops into the display position, and in doing this encounters and passes the cam-head 75 on the lever 73, thereby turning the cam-finger 74 on the lower end of that lever across the trip-pin 67 on the lever 66 of the phonograph-reproducer, with the effect of releasing the nut from the screw of the phonograph and permitting a weight 84, which is commonly provided for the purpose in a phonograph, to return the reproducer to its initial position ready to be again engaged with the screw by inserting a coin into the coin-chute to trip the lever 61, with the results already described.

Figure 16:
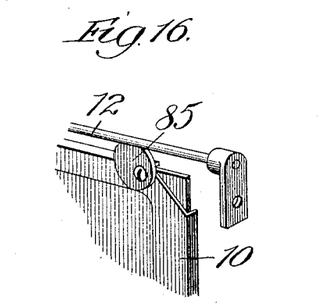
Fig. 16, a similar view of a modification of the adjustable stop device for the picture-frames.

The foregoing specification accurately describes the parts illustrated in the drawings to represent the apparatus as actually constructed to operate in the manner explained. These parts and their manner of coöperation may, however, be variously modified without departure from the gist of the invention, the important feature of which is that of providing for varying the stoppage of the members of the picture-frame series to correspond with the length of speech or song being rendered by the phonographic instrument applicable to the particular picture in the series under display. As an example of the variation possible in the stop device a modification is shown in Fig. 16 comprising the bar 12 devoid of the stop-screws 13, which are supplanted by cam-disks 85, pivoted to the picture-frames to project beyond their edges, one being provided on each frame and adapted to be adjusted by setting it to project to any desired extent beyond the edge of the frame for varying accordingly the length of time of stoppage of the picture-frame by abutment of its respective cam against the bar 12 in its path. Obviously the stops 85 need not be relatively disposed spirally on the picture-frames, but may be arranged in any desired order. As will be understood, if, for example, the rendition of the phonographic instrument requires three minutes to finish it and fifteen of the picture-frames are provided in the series thereof, as shown, the average period for the display of the picture and accordingly for the stoppage of each short of the display position will be twelve seconds, the adjustable stops permitting the time to be divided between the picture-frames to display some for longer and others for shorter periods, whereby any picture may be retained under display during the rendition of the part which applies to it of the address, song, or the like being reproduced by the phonograph.

It is within my invention to substitute for the phonograph any music-producing instrument adapted to render music applicable to the pictures under exhibition and to be reset as described of the phonograph.

What I claim as new, and desire to secure by Letters Patent, is—

1. In combination, a picture-exhibitor of the character described having a series of picture-frames, a phonograph or other suitable music-producing instrument, motor mechanism for coöperatively actuating them, means for starting said motor mechanism, a stop-bar under which the picture-frames pass in their course to the display position, adjustable stops on said bar, and lugs on said frames to engage with said stops.

2. In combination, a picture-exhibitor of the character described having a series of picture-frames, a phonograph or other suitable music-producing instrument, motor mechanism for coöperatively actuating them, means for starting said motor mechanism, a stop-bar under which the picture-frames pass in their course to the display position, a series of vertically-adjustable stop-pins on said bar, and lugs on said frames to engage with said pins.

3. In combination, a picture-exhibitor of the character described having a series of picture-frames, a phonographic instrument, an electric motor geared to said exhibitor and instrument to actuate them correspondingly, switch mechanism for closing the motor-circuit, a starting device for the reproducer of said instrument actuated by said switch mechanism, and a releasing device for said reproducer at the end of said instrument, actuated by a picture-frame in dropping to the display position to permit the reproducer to be retracted by its controlling-weight.

4. In combination, a picture-exhibitor of the character described having a series of picture-frames, and adjustable stops for engaging the picture-frames to arrest them in their course to the display position, a phonographic instrument, an electric motor geared to said exhibitor and instrument to actuate them correspondingly, switch mechanism for closing the motor-circuit, a starting device for the reproducer of said instrument actuated by said switch mechanism, and a releasing device for said reproducer actuated by a picture-frame in dropping to the display position to permit the reproducer to be retracted.

5. In combination, a picture-exhibitor of the character described having a series of picture-frames, a stop-bar under which said frames pass in their course to the display position, and adjustable stops for engaging the picture-frames to arrest them in said course, a phonographic instrument, an electric motor geared to said exhibitor and instrument to actuate them correspondingly, switch mechanism for closing the motor-circuit, a starting device for the reproducer of said instrument actuated by said switch mechanism, and a releasing device for said reproducer actuated by a picture-frame in dropping to the display position to permit the reproducer to be retracted.

6. In combination, a picture-exhibitor of the character described having a series of picture-frames, a phonographic instrument having a pin projecting from its starting-lever, an electric motor geared to said exhibitor and instrument to actuate them correspondingly, switch mechanism for closing the motor-circuit, a starting device actuated by said switch mechanism to engage said lever, and a releasing device for said reproducer comprising a pivotal finger provided with a cam-head projecting into the path of a picture-frame in the series thereof and having a cam on its lower end extending into the path of said pin for tripping said lever to permit the reproducer to be retracted by its controlling-weight.

7. In combination, a picture-exhibitor of the character described having a series of picture-frames, a phonograph, or other suitable music-producing instrument, motor mechanism for coöperatively actuating them, a stop-bar under which the picture-frames pass in their course to the display position; adjustable stops on said bar for arresting the picture-frames in said course, and a spring-retracted pivotally-supported finger having a trip-cam on its upper end in the path of the picture-frames in the series thereof and provided below said end with a ledge for holding said frames in the picture-display position.

8. In combination, a picture-exhibitor of the character described carrying on its rotatory shaft a cam-disk provided with a stud, a spring-retracted bell-crank extending into the path of said stud and carrying a stud, a second spring-retracted bell-crank in the path of the stud on said first-named bell-crank and engaging at its upper end with said cam-disk, an electrical contact one member of which is on said second bell-crank and is adapted to engage by the throw thereof with the other member, a third bell-crank lever engaging at one end normally with the lower end of said bell-crank carrying the contact member to hold the latter out of engagement with the other contact member, an electric motor in circuit with said contact, means for starting said motor, and a phonograph or other suitable music-producing instrument geared with said picture-exhibitor to said motor, the whole being constructed and arranged to operate substantially as described.

9. In combination, a picture-exhibitor of the character described having a series of picture-frames and carrying on its rotary shaft a cam-disk provided with a stud, a spring-retracted bell-crank extending into the path of said stud and carrying a stud, a second spring-retracted bell-crank in the path of the stud on said first-named bell-crank and engaging at its upper end with said cam-disk, an electrical contact one member of which is on said second bell-crank and is adapted to engage by the throw thereof with the other member, a third bell-crank lever engaging at one end normally with the lower end of said bell-crank carrying the contact member to hold the latter out of engagement with the other contact member, an electric motor in circuit with said contact, means for starting said motor, a phonographic instrument geared with said picture-exhibitor and to said motor, a trip connection with the lever of the phonograph-reproducer extending into the path of said second bell-crank to be actuated by its release, a pin on said reproducer-lever, a ledge-equipped pivotal cam-finger in the path of the picture-frames in the series thereof, and a pivotal finger in the path of one of said frames having a cam-head to be engaged by said frame and a cam on its lower end in the path of said pin on the reproducer-lever, the whole being constructed and arranged to operate substantially as described.

HERBERT S. MILLS.

In presence of—
 WALTER N. WINBERG,
 W. B. DAVIES.